(12) United States Patent
Jinno et al.

(10) Patent No.: US 12,147,436 B2
(45) Date of Patent: Nov. 19, 2024

(54) BATTERY INFORMATION PROCESSING SYSTEM AND BATTERY INFORMATION PROCESSING METHOD TO IDENTIFY BATTERIES IN ACCORDANCE WITH A SPECIFICATION

(71) Applicant: HONDA MOTOR CO., LTD., Tokyo (JP)

(72) Inventors: Tatsuya Jinno, Wako (JP); Takumi Shiiyama, Wako (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 17/885,492

(22) Filed: Aug. 10, 2022

(65) Prior Publication Data

US 2022/0382771 A1    Dec. 1, 2022

Related U.S. Application Data

(63) Continuation of application No. PCT/JP2021/007865, filed on Mar. 2, 2021.

(30) Foreign Application Priority Data

Mar. 27, 2020 (JP) ................................. 2020-057884

(51) Int. Cl.
*G06F 16/24* (2019.01)
*B60L 50/60* (2019.01)
(Continued)

(52) U.S. Cl.
CPC ........ *G06F 16/24578* (2019.01); *B60L 50/60* (2019.02); *G06F 16/248* (2019.01);
(Continued)

(58) Field of Classification Search
CPC ........ B60L 2250/16; B60L 3/12; B60L 50/60; B60L 58/16; B60L 58/21;
(Continued)

(56) References Cited

U.S. PATENT DOCUMENTS 7,103,460 B1 *  9/2006  Breed .................... G07C 5/008
                                                          706/15
9,285,433 B2    3/2016  Kurimoto
(Continued)

FOREIGN PATENT DOCUMENTS

| CN | 103081213 A | 5/2013 |
|---|---|---|
| CN | 103560277 A | 2/2014 |

(Continued)

OTHER PUBLICATIONS

International Search Report and Written Opinion for PCT/JP2021/007865 mailed May 11, 2020.
(Continued)

*Primary Examiner* — Vinh P Nguyen
(74) *Attorney, Agent, or Firm* — Thomas | Horstemeyer, LLP (57) ABSTRACT

A battery information processing system having: an acquisition unit configured to acquire battery information including use histories of batteries, a classification unit configured to classify the batteries for each property on the basis of properties of the batteries and store the battery information in a plurality of databases classified for each property, a selection unit configured to select a database including high priority battery information from the plurality of classified databases, a determination unit configured to determine the selected database as a database for selecting a combination of a plurality of batteries in a case in which a property of an assembled battery calculated by combining a plurality of batteries satisfies a criterion, and a presentation unit config-
(Continued)

ured to present combination information of the plurality of batteries selected in a descending order from the highest coincidence.

6 Claims, 6 Drawing Sheets

(51) Int. Cl.
*G06F 16/2457* (2019.01)
*G06F 16/248* (2019.01)
*G06F 16/28* (2019.01)
*G07C 5/00* (2006.01)
*H01M 10/42* (2006.01)
*H01M 10/48* (2006.01)
*H02J 7/00* (2006.01)

(52) U.S. Cl.
CPC ........... *G06F 16/285* (2019.01); *G07C 5/008* (2013.01); *H01M 10/425* (2013.01); *H01M 10/482* (2013.01); *H02J 7/00032* (2020.01); *H02J 7/0063* (2013.01); *H01M 2010/4271* (2013.01); *H01M 2010/4278* (2013.01); *H01M 2220/20* (2013.01)

(58) Field of Classification Search
CPC ............. G06F 16/24578; G06F 16/248; G06F 16/285; G06Q 10/20; G06Q 50/06; G07C 5/008; H01M 10/42; H01M 10/425; H01M 10/48; H01M 10/482; H01M 2010/4271; H01M 2010/4278; H01M 2220/20; H02J 7/00032; H02J 7/0013; H02J 7/0047; H02J 7/0063; H02J 7/0071; Y02E 60/10; Y02T 10/70; Y02T 10/7072; Y02T 90/12; Y02T 90/16; Y02T 90/167; Y04S 30/12; Y04S 30/14
See application file for complete search history.

(56) References Cited

U.S. PATENT DOCUMENTS

| | | | |
|---|---|---|---|
| 10,580,224 B2 * | 3/2020 | Kurimoto | ........... H01M 10/425 |
| 11,271,255 B2 * | 3/2022 | Vickery | .............. H01M 10/443 |
| 11,724,615 B2 | 8/2023 | Suzuki | |
| 11,865,941 B2 | 1/2024 | Suzuki | |
| 11,875,608 B1 * | 1/2024 | Nichols | .................. G06Q 50/40 |
| 2013/0090872 A1 | 4/2013 | Kurimoto | |
| 2019/0207267 A1 | 7/2019 | Vickery et al. | |
| 2021/0001744 A1 | 1/2021 | Suzuki | |
| 2021/0090153 A1 * | 3/2021 | Murai | ................ G06Q 30/0631 |
| 2023/0011148 A1 * | 1/2023 | Jeong | ..................... B60L 58/16 |
| 2023/0286405 A1 | 9/2023 | Suzuki | |

FOREIGN PATENT DOCUMENTS

| | | |
|---|---|---|
| CN | 104866872 A | 8/2015 |
| CN | 106936219 A | 7/2017 |
| CN | 107576916 A | 1/2018 |
| JP | 2005-302337 A | 10/2005 |
| JP | 2013-084198 A | 5/2013 |
| JP | 2017-134894 A | 8/2017 |
| JP | 2018-050457 A | 3/2018 |
| JP | 2019-153576 A | 9/2019 |
| JP | 2020-005463 A | 1/2020 |
| WO | 2018/192190 A1 | 10/2018 |

OTHER PUBLICATIONS

IPRP for PCT/JP2021/007865 mailed Nov. 2, 2021.
Chinese Office Action for Chinese Patent Application No. 202180014804.5 mailed Mar. 22, 2024 (partially translated).

* cited by examiner

BATTERY INFORMATION PROCESSING SYSTEM AND BATTERY INFORMATION PROCESSING METHOD TO IDENTIFY BATTERIES IN ACCORDANCE WITH A SPECIFICATION

CROSS-REFERENCE TO RELATED APPLICATION(S)

This application is a continuation of International Patent Application No. PCT/JP2021/007865 filed on Mar. 2, 2021, which claims priority to and the benefit of Japanese Patent Application No. 2020-057884 filed on Mar. 27, 2020, the entire disclosures of which are incorporated herein by reference.

BACKGROUND OF THE INVENTION

Field of the Invention

The present invention relates to a battery information processing system and a battery information processing method.

Description of the Related Art

In recent years, reuse of batteries (reused batteries) mounted in electric vehicles and hybrid vehicles that have proliferated worldwide has been considered, and reuse of the reused batteries as assembled batteries has been considered. Japanese Patent Laid-Open No. 2017-134894 discloses a technique for increasing the efficiency of reuse of assembled batteries packaged by combining single batteries by enhancing the accuracy of estimating the degree of degradation of the batteries.

However, since degradation state (hereinafter, referred to as "State Of Health (SOH)") of the reused batteries differs depending on previous use environments and applications, electrical properties of the individual batteries differ. Also, performances to be prioritized are different depending on applications when users use the batteries at the time of the reuse.

The present invention provides a technique capable of storing battery information including a use history of batteries in databases categorized for each property and presenting a combination of a plurality of batteries with high coincidence with a required specification from a database including high priority battery information on the basis of user's required specification.

SUMMARY OF THE INVENTION

According to one aspect of the present invention, there is provided a battery information processing system comprising: an acquisition unit configured to acquire battery information including use histories of batteries via a network; a classification unit configured to classify the batteries for each property on the basis of properties of the batteries specified from the battery information and store the battery information in a plurality of databases classified for each property; a selection unit configured to select a database including high priority battery information from the plurality of classified databases on the basis of a required specification extracted from user presented information including information regarding a model of a reused product to which the batteries are to be applied or an application of the reused product; a determination unit configured to determine the selected database as a database for selecting a combination of a plurality of batteries in a case in which a property of an assembled battery calculated by combining a plurality of batteries extracted from the selected database satisfies a criterion required by the required specification; and a presentation unit configured to present combination information of the plurality of batteries selected in a descending order from the highest coincidence with the required specification from the determined database.

According to the present invention, it is possible to provide a technique capable of storing battery information including a use history of batteries in databases categorized for each property and presenting a combination of a plurality of batteries with high coincidence with a required specification from a database including high priority battery information on the basis of user's required specification.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(Battery Information Processing System)

Figure 1:
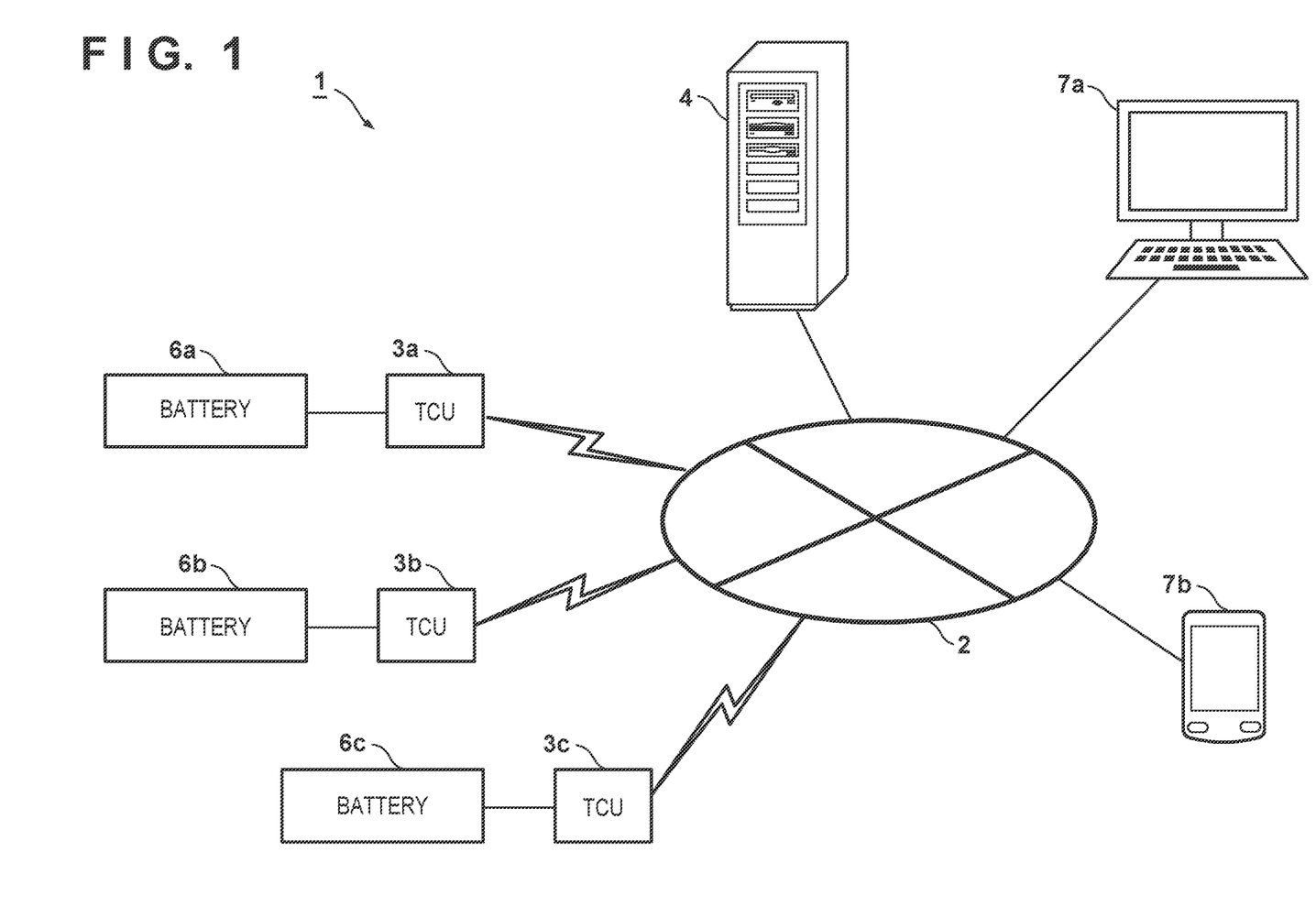
FIG. 1 is a block diagram illustrating a configuration of a battery information processing system according to an embodiment.

FIG. 1 is a block diagram illustrating a configuration of a battery information processing system 1 according to a representative embodiment of the present invention. The battery information processing system 1 illustrated in FIG. 1 includes information communication apparatuses 3a to 3c (telematics control units: TCUs), information processing apparatuses 7a and 7b, and a server (information distribution apparatus) 4 communicatively connected via a network 2.

The information communication apparatuses 3a to 3c (TCUs) can perform signal processing for performing communication with the server 4 via the network 2. The information communication apparatuses 3a to 3c (TCUs) are connected to batteries 6a to 6c and transmit information acquired from the batteries 6a to 6c to the server 4 via the network 2. The plurality of information communication apparatuses 3a to 3c (TCUs) are provided, for example, in stationary power storage apparatuses that are run for solar power generation, wind power generation, and the like, working machines such as lawn mowers, tillers, and snowblowers, storage batteries for disasters, storage batteries for home use, electric motorcycles such as electric scooters, electric vehicles, hybrid vehicles, and the like.

Here, the batteries include reused batteries obtained by reusing batteries that used to be mounted in vehicles that travel using electric motors as power sources and used to supply power to the electric motors. Reused batteries refers to reusable secondary batteries that used to be used as storage devices, are chargeable, and are not suitable for electric motorcycles such as electric scooters, electric vehicles, and hybrid vehicles, for example, due to the power storage capacity dropping below a predetermined amount, but that are reusable for other applications. Representative examples thereof include lithium ion batteries.

The information processing apparatuses 7a and 7b function as user operation terminals and are, for example, information processing apparatuses in the form of personal computers, general-purpose computers, tablet terminals, smartphones, or the like. The information processing apparatuses 7a and 7b are connected to the server 4 via the network 2 and can transmit information to the server 4, receive information transmitted from the server 4, and present the received information on a display unit. A battery presentation program has been installed in the information processing apparatuses 7a and 7b as an application program for controlling processing inside the information processing apparatuses, and the information processing apparatuses 7a and 7b present display screens (user interfaces) for inputting presentation information to be transmitted to the server 4 and process information received from the server 4 through execution of the battery presentation program.

(Configuration of Reused Battery)

Figure 2:
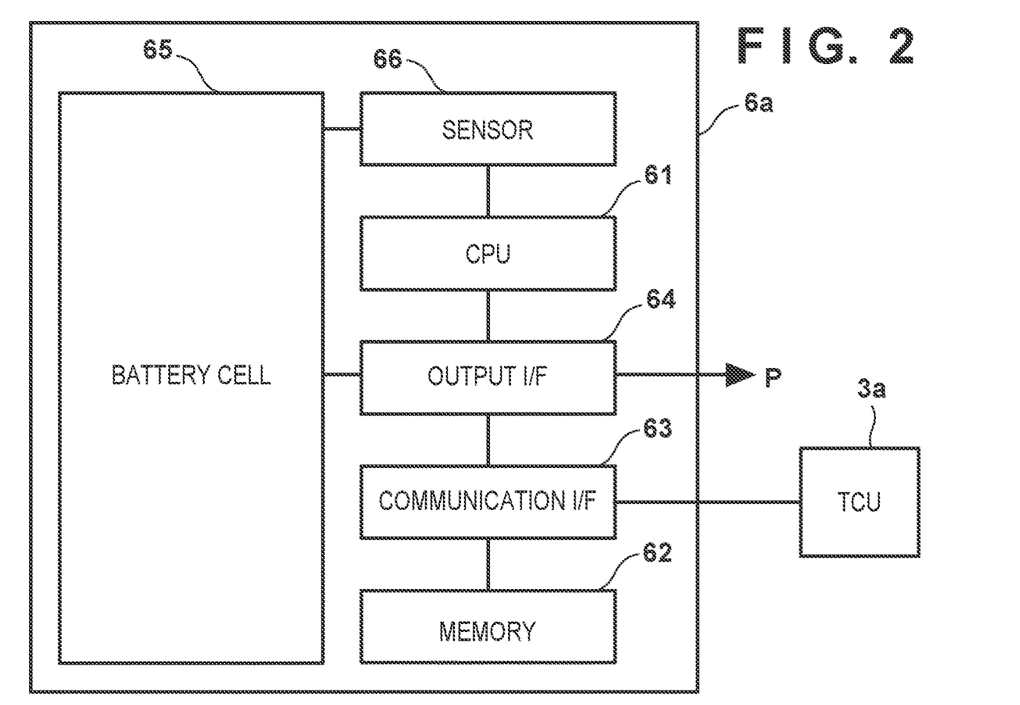
FIG. 2 is a block diagram illustrating a configuration of a reused battery.

FIG. 2 is a block diagram illustrating a configuration of a reused battery. Although the battery 6a will be described below as a representative, the same applies to the other batteries 6b and 6c. The used battery incorporates, as battery cells 65, a plurality of cells constituted of lithium (Li) ion batteries. As the reused batteries, it is also possible to use, as cells of the battery cells 65, sodium ion secondary batteries, potassium ion secondary batteries, and the like in addition to the lithium (Li) ion batteries.

As illustrated in FIG. 2, discharge voltages, output currents, cell temperatures, and the like of the battery cells 65 are monitored by a sensor 66. Power P supplied from the battery cells 65 is supplied via an output I/F 64 (output interface) having an output terminal. A CPU 61 stores, in a memory 62 (storage unit) various kinds of physical amount data measured by the sensor 66. The memory 62 includes a ROM that stores a control program for causing the CPU 61 to operate and a RAM that is used as a work area for executing the control program. Also, the memory 62 stores element information and the like indicating model information of the battery 6a and rated performance of the battery. Additionally, the memory 62 also stores the maximum capacity, charge/discharge cycle, and use history information such as a SOH and a State Of Charge (SOC) and the like of the battery. The communication I/F 63 (communication interface) is an interface that connects the information communication apparatus 3a (TCU) to the battery 6a, and the information communication apparatus 3a (TCU) transmits information acquired from the memory 62 of the battery 6a to the server 4 via the communication I/F 63.

The server 4 generates a database of battery information on the basis of information transmitted from the information communication apparatuses 3a to 3c (TCUs). The battery information acquired by the server 4 includes information transmitted from external terminals in addition to the information transmitted from the information communication apparatuses 3a to 3c (TCUs). The databases of the batteries 6a to 6c generated by the server 4 include information regarding batteries as new products and information of batteries acquired in an inspection process at the time of reusing of the batteries, in addition to information of the reused batteries after use.

(Configuration of Server)

Figure 3:
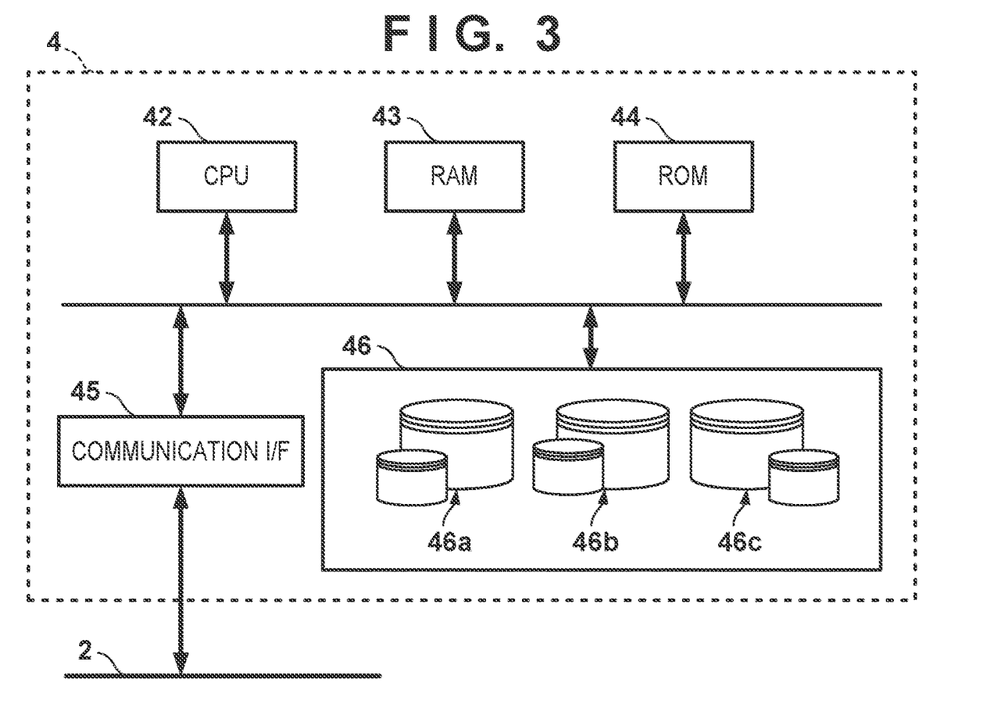
FIG. 3 is a block diagram illustrating a configuration of a server.

FIG. 3 is a block diagram illustrating a configuration of a server 4. As illustrated in FIG. 3, the server 4 includes a CPU 42 that performs execution and control of arithmetic operations in the server 4, a RAM 43, a ROM 44, a communication interface (I/F) 45, and a large-capacity storage device 46.

The server 4 can establish a communication link with the network 2 via the interface 45 and further communicate with the information communication apparatuses 3a to 3c and the information processing apparatuses 7a and 7b via the network 2. The server 4 acquires, via the network 2, the battery information including use history of the batteries via the communication interface 45.

The CPU 42 classifies the batteries for each property on the basis of properties of the batteries specified from the battery information and stores the battery information in a database classified for each property. A plurality of databases 46a, 46b, and 46c are constructed in the storage device 46, and the databases 46a, 46b, and 46c store data collected from the plurality of information communication apparatuses via the network 2. The information in the batteries 6a to 6c collected from the information communication apparatuses 3a to 3c are classified (clustered) into a plurality of clusters on the basis of element information indicating rated performance of the batteries and information (use history information) regarding use histories of the batteries, and the classified (clustered) battery information is stored in the databases 46a, 46b, and 46c corresponding to each cluster. The databases 46a, 46b, and 46c are classified (clustered) into, for example, a database that maintains a power capacity, a database that maintains an output voltage, a database that maintains an internal resistance, or the like.

The CPU 42 obtains a battery property (Bave) indicating an average for the plurality of batteries on the basis of the acquired battery information. The CPU 42 calculates a plurality of parameters (coefficients ki) indicating degrees of change in properties of the batteries with reference to the battery property (Bave) indicating the average and specifies a property (B) of the battery on the basis of the plurality of calculated parameters (coefficients ki).

The CPU 42 of the server 4 obtains a battery property (Bave={C01, C02, C03, . . . C0n}) indicating an average for the entire reused battery group (batteries 6a to 6c). Here, the parameter (COi) configuring the battery property (Bave) includes various evaluation parameters corresponding to SOC, SOH, and the like as the element information indicating the rated performance of the batteries and the information (use history information) regarding the battery use histories.

Then, the CPU 42 evaluates each battery with reference to the battery property indicating the average and specifies the battery property of each battery as B={C01×k1, C02×k2, C03×k3, C0n×kn}.

In the battery property B specified by the CPU 42, the coefficient ki indicating the battery property is a parameter indicating a degree of a change in property of each battery corresponding to the battery property of the average for the entire reused battery group (batteries 6a to 6c), and the CPU 42 classifies the reused battery group (batteries 6a to 6c) for each property on the basis of the parameter.

The CPU 42 determines a high priority parameter from the plurality of parameters (coefficients ki) on the basis of a user's required specification and selects a database including the battery information specified on the basis of the determined parameter. The CPU 42 selects the optimal databases 46a, 46b, and 46c from the classified (clustered) databases 46a, 46b, and 46c on the basis of the presentation information input from users of the information processing apparatuses 7a and 7b and selects a battery or a combination of a plurality of batteries in accordance with users' requests (required costs).

Here, the users' presentation information is information indicating the users' requests regarding selection of the batteries and includes, for example, names of reused products to which the reused batteries are to be applied, models of the products, applications of the reuse, and prices (desired prices) of the batteries that the users desire.

(Configuration of Information Processing Apparatus)

Figure 4:
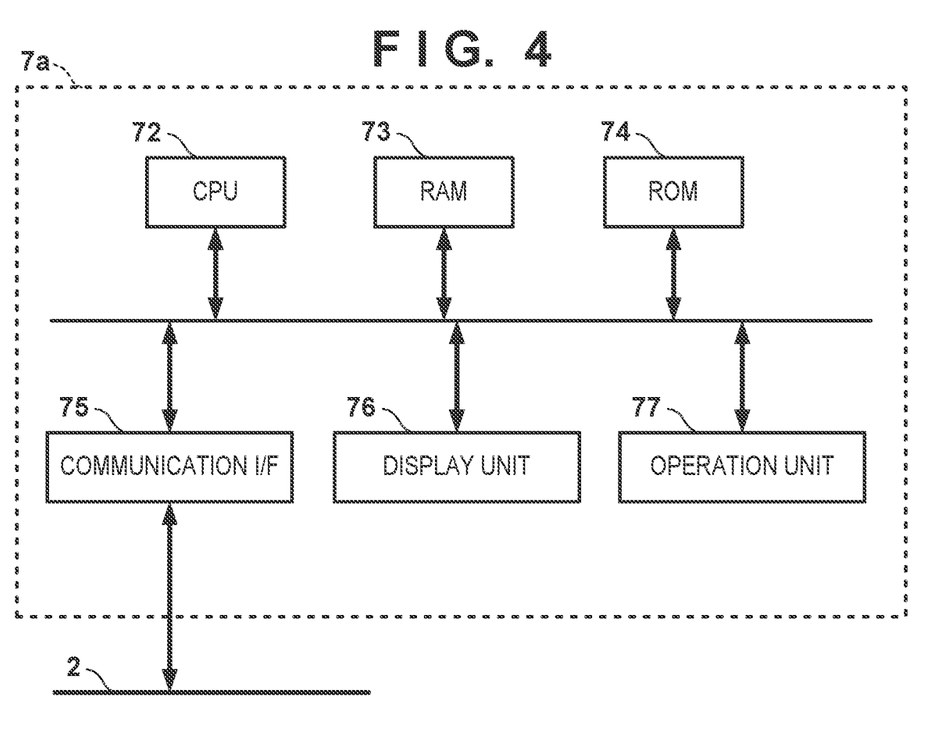
FIG. 4 is a diagram illustrating a configuration of an information processing apparatus.

Next, a configuration of an information processing apparatus that functions as a user's operation terminal will be described. Although the information processing apparatus 7a will be described below as a representative, the same applies to the other information processing apparatus 7b. FIG. 4 is a diagram illustrating a configuration of the information processing apparatus 7a in the form of a personal computer (PC). As illustrated in FIG. 4, the information processing apparatus 7a includes a CPU 72 that performs execution and control of arithmetic operations in the information processing apparatus 7a, a RAM 73, a ROM 74, a communication interface (I/F) 75, a display unit 76, and an operation unit 77 that is for operating the information processing apparatus 7a. The operation unit 77 includes an information input unit such as a touch panel, a keyboard, and the like, such that the user can input presentation information through the operation unit 77. If the battery presentation program installed in the ROM 74 is executed under control of the CPU 72, the program is developed on the RAM 73, and a display screen (user interface) for inputting the presentation information is displayed on the display unit 76. The user inputs user's presentation information (for example, a name of a reused product, a model of the product, an application of the reuse, a price of the battery that the user desires (desired price), and the like) through the operation unit 77 while viewing the display screen of the display unit 76.

If the user completes the input of the presentation information, the information processing apparatus 7a establishes communication with the server 4 via the network 2. The server 4 selects optimal databases 46a, 46b, and 46c from the classified (clustered) databases 46a, 46b, and 46c on the basis of the input presentation information, selects a suitable battery or combination of a plurality of batteries in accordance with the user's request (required cost), and transmits information regarding the selected battery to the information processing apparatus 7a via the network 2. The information processing apparatus 7a displays the information provided from the server 4 on the display unit 76. The information provided from the server 4 is subjected to utilization of the reused battery for the user.

Figure 5:
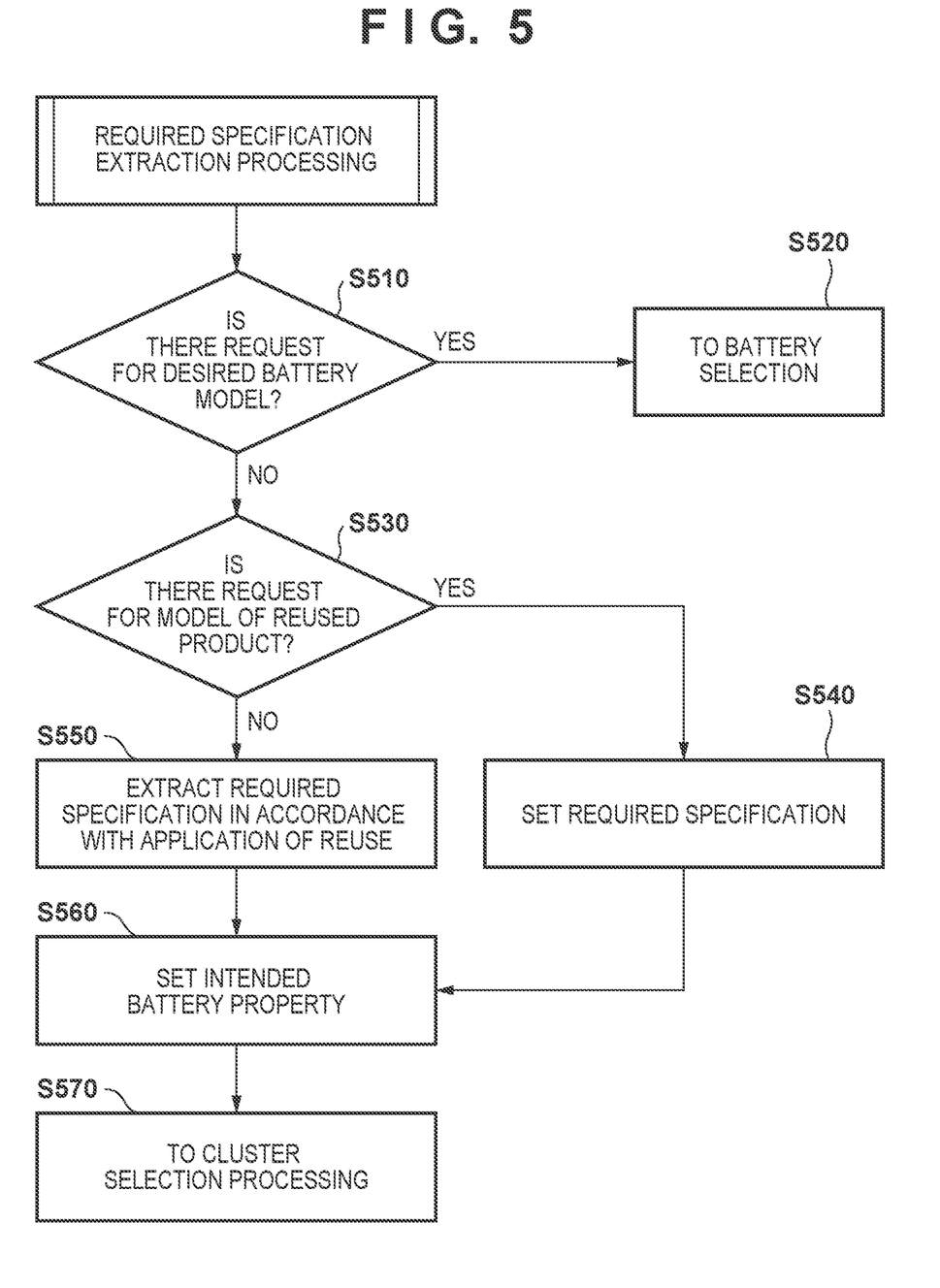
FIG. 5 is a diagram for explaining a flow of required specification extraction processing.
Figure 6:
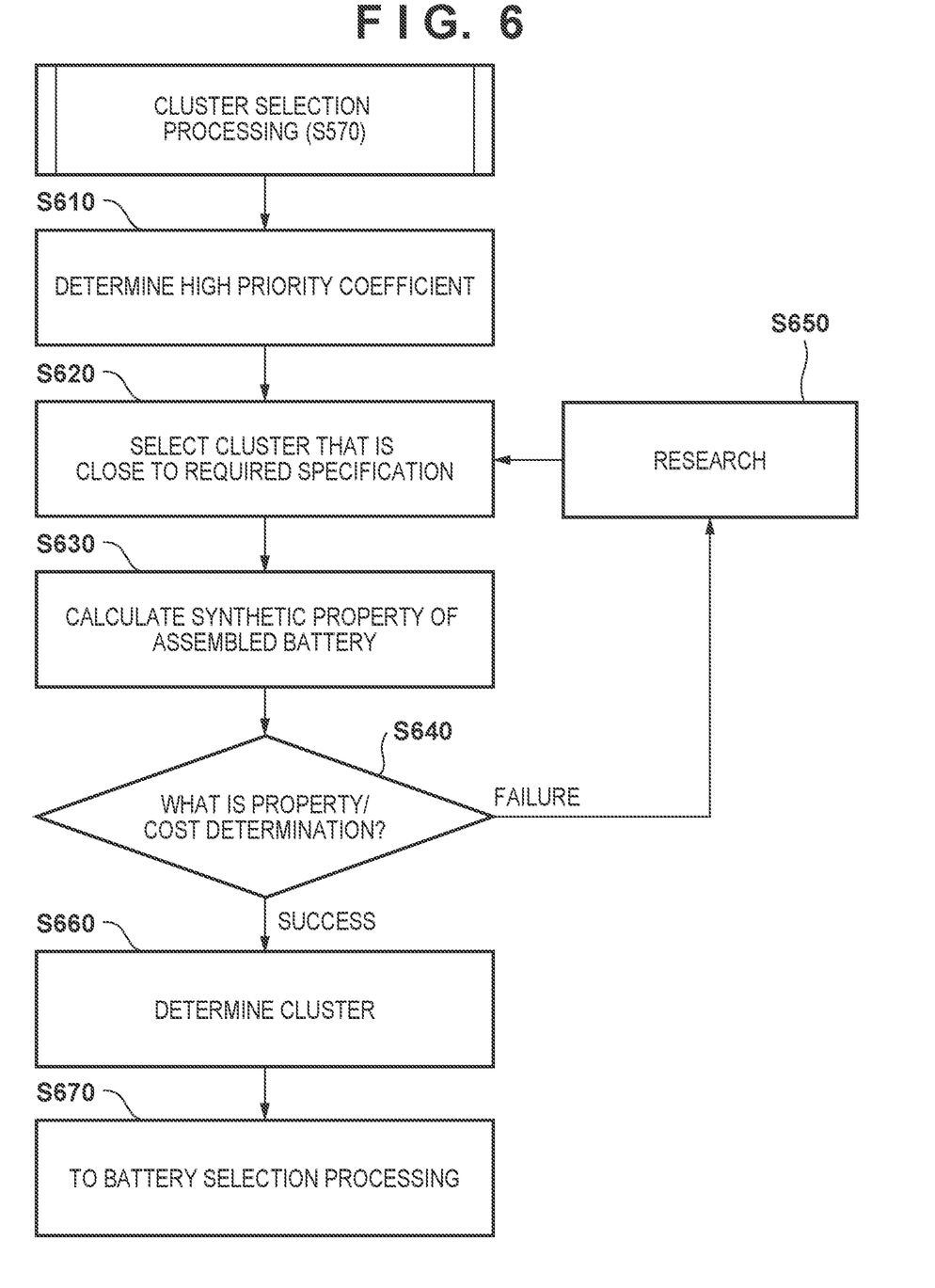
FIG. 6 is a diagram for explaining a flow of cluster selection processing.
Figure 7:
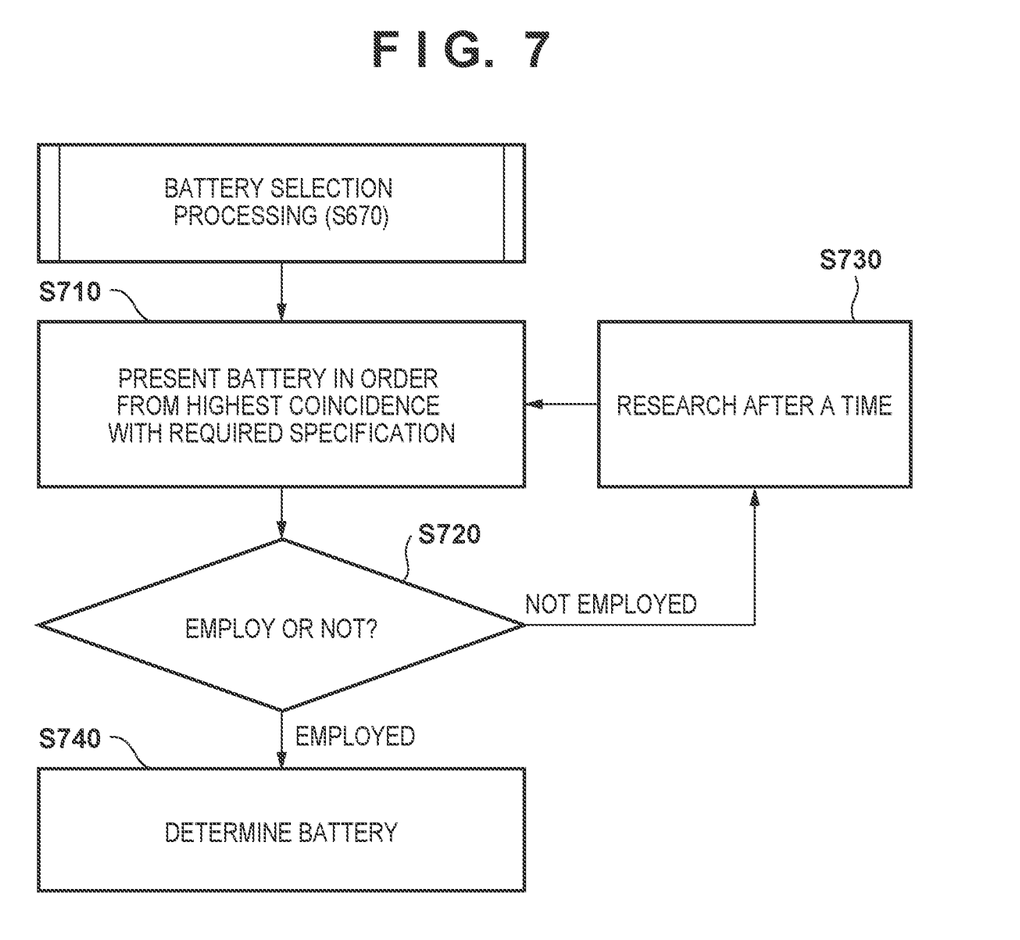
FIG. 7 is a diagram for explaining a flow of battery selection processing.

Next, a flow of processing executed by the battery information processing system 1 with the aforementioned configuration will be described. FIGS. 5 to 7 are diagrams for explaining a flow of battery selection processing in the battery information processing system, where FIG. 5 is a diagram for explaining a flow of a required specification extraction processing, FIG. 6 is a diagram for explaining a flow of cluster selection processing, and FIG. 7 is a diagram for explaining a flow of a battery selection processing from a selected cluster.

(Required specification extraction processing: FIG. 5)

In Step S510, the CPU 42 of the server 4 determines whether or not a request for a desired battery model is included in presentation information on the basis of the user's presentation information. In a case in which the presentation information includes the request for a desired battery model, the processing proceeds to Step S520, and the battery selection processing (FIG. 7) is executed.

In a case in which the user's presentation information does not include the request for a desired battery model in the determination processing in Step S510, whether or not a request for a model of a reused product is included in the presentation information is determined in Step S530. In a case in which the presentation information includes the request for a model of the reused product, the CPU 42 fixes the required specification of the reused battery in Step S540, and the processing proceeds to Step S560.

On the other hand, in a case in which there is no request for a model of a reused product in the determination processing in Step S530, the CPU 42 extracts a required specification in accordance with an application of the reuse of the reused battery in Step S550.

In Step S560, the CPU 42 sets a battery property $[Br=\{C01r \times k1r, C02r \times k2r, C03r \times k3r, \ldots C0nr \times knr\}]$ on the basis of the required specification extracted in preceding Step S550 and the required specification of the reused battery fixed in Step S540.

Then, the processing proceeds to Step S570, and the CPU 42 executes the cluster selection processing (FIG. 6).

(Cluster Selection Processing: FIG. 6)

The CPU 42 selects a database including high priority battery information from the classified databases on the basis of the required specification extracted from the user's presentation information.

In Step S610, the CPU 42 determines a coefficient kir of the battery property from among the battery properties Br set in Step S560 in FIG. 5 on the basis of the priority required by the required specification (S540, S550).

For example, in a case of use in a stationary storage device as an application of the reuse, the coefficient kir is determined such that a battery specification with a low internal resistance is achieved in order to facilitate assistance of an output voltage for a period of time that is as long as possible by placing priority on the capacity maintaining rate and the capacity for each cost rather than an instantaneous output. Also, in a case of use in a mobile body such as an electric scooter, the coefficient kir is determined such that a battery specification that allows for a large instantaneous output is achieved for satisfactory acceleration performance, for example. Moreover, in a case in which it is desired to extend the travelable distance, the coefficient kir is determined such that a battery specification of assisting the output power rather than the instantaneous output is achieved. The battery property Br is determined on the basis of the user's required specification (S540, S550) through the determination of the coefficient kir.

In Step S620, the CPU 42 selects a cluster (database) that is close to the required specification (S540, S550) on the basis of the battery property Br determined in Step S610.

Then, in Step S630, the CPU 42 calculates a synthetic property of an assembled battery obtained by combining batteries extracted from the selected cluster (database).

In Step S640, the CPU 42 determines whether or not the calculated synthetic property Br of the assembled battery satisfies the battery property (S610) and a cost criterion set from the required specification (S540, S550).

In a case in which the synthetic property Br does not satisfy the battery property (S610) and the cost criterion (S640; failure) in the determination in Step S640, the processing proceeds to Step S650, research processing is executed, and processing in and after Step S620 is executed again. Note that it is also possible to notify the user of the fact that there are no corresponding reused batteries or to present use of new batteries, instead of the research processing.

On the other hand, in a case in which the synthetic property Br satisfies the battery property (S610) and the cost criterion (S640; success) in the determination processing in Step S640, the CPU 42 determines the cluster (database), which has been selected in Step S620, in Step S660.

Then, the processing proceeds to Step S670, and the CPU 42 executes the battery selection processing (FIG. 7).

(Battery Selection Processing: FIG. 7)

The CPU 42 presents a combination of a plurality of batteries with high coincidence with the required specification from the selected cluster (database). The CPU 42 presents a combination of a plurality of batteries with high cost performance, for example, as batteries with high coincidence with the required specification.

In Step S710, the CPU 42 transmits, to the information processing apparatus, battery combination information in the descending order from the highest coincidence with the required specification from the cluster (database) determined in Step S660 and presents the combination of the batteries corresponding to the user's presentation information to the user. The CPU 72 of the information processing apparatus presents the battery combination information transmitted from the server 4 to the display unit 76. The user can check the combination of the batteries proposed by the server 4 through the display on the display unit 76.

In Step S720, the CPU 72 of the information processing apparatus determines whether or not to employ the presented batteries on the basis of the user's operation input from the operation unit 77. In a case in which the batteries are not employed in the determination in Step S720, the processing proceeds to Step S730, research processing is executed after a time, and the processing in and after Step S710 is executed again. Note that it is also possible to notify the user of the fact that there are no corresponding reused batteries or to present use of new batteries, instead of the research processing.

On the other hand, in a case in which the CPU 72 of the information processing apparatus employs the presented batteries on the basis of the user's operation input from the operation unit 77 in the determination in Step S720, the batteries that are to be finally combined are determined, and the processing is ended.

Summary of Embodiment

The above embodiment discloses at least the following battery information processing system and battery information processing method.

Configuration 1. A battery information processing system described above includes:

- an acquisition unit (45 in FIG. 3, for example) configured to acquire battery information including use histories of batteries (6a, 6b, and 6c in FIG. 1, for example) via a network (2 in FIG. 1, for example);
- a classification unit (42 in FIG. 3, for example) configured to classify the batteries for each property on the basis of properties (B) of the batteries specified from the battery information and store the battery information in databases (46a, 46b, and 46c in FIG. 1, for example) classified for each property;
- a selection unit (42 in FIG. 3, for example) configured to select a database including high priority battery information from the classified databases on the basis of a required specification extracted from user presented information (S510 to S570 in FIG. 5); and
- a presentation unit (42 in FIG. 3, for example) configured to present a combination of a plurality of batteries with high coincidence with the required specification from the selected database.

According to the battery information processing system with Configuration 1, it is possible to provide a technique capable of storing battery information including a use history of batteries in databases categorized for each property and presenting a combination of a plurality of batteries with high coincidence with a required specification from a database including high priority battery information on the basis of user's required specification.

Configuration 2. In the battery information processing system (for example, 1) in the above embodiment, the classification unit (42) obtains a battery property (Bave) indicating an average for a plurality of batteries on the basis of the battery information acquired by the acquisition unit (45).

Configuration 3. In the battery information processing system (for example, 1) in the above embodiment, the classification unit (42) calculates a plurality of parameters (Ki) indicating degrees of change in properties of the batteries with reference to a battery property (Bave) indicating the average and specifies the properties (B) of the batteries on the basis of the plurality of calculated parameters (Ki).

According to the battery information processing system with Configurations 2 and 3, it is possible to classify each battery for each property on the basis of the plurality of parameters indicating the degrees of change in properties of the batteries.

Configuration 4. In the battery information processing system (for example, 1) in the above embodiment, the selection unit (42) determines a high priority parameter from the plurality of parameters on the basis of the required specification, and selects a database including information of batteries specified on the basis of the determined parameters.

According to the battery information processing system with Configuration 4, it is possible to select a database including information of the batteries that coincide with the user's required specification by determining the high priority parameter from the plurality of parameters on the basis of the required specification.

Configuration 5. In the battery information processing system (for example, 1) in the above embodiment, the battery includes a reused battery that is a reused battery that used to be mounted in a vehicle that travels using an electric motor as a power source and used to supply power to the electric motor.

According to the battery information processing system with Configuration 5, it is possible to present reused battery combination information that coincides with the user's required specification when the reused batteries are reused and to efficiently promote reuse of the reused batteries.

Configuration 6. A battery information processing method described in the above embodiment is a battery information processing method of a battery information processing system (1 in FIG. 1, for example), the method including:
- an acquisition process (45 in FIG. 3, for example) of acquiring battery information including use histories of batteries (6*a*, 6*b*, and 6*c* in FIG. 1, for example) via a network (2 in FIG. 1, for example);
- a classification process (42 in FIG. 3, for example) of classifying the batteries for each property on the basis of properties (B) of the batteries specified from the battery information and storing the battery information in databases (46*a*, 46*b*, and 46*c* in FIG. 1, for example) classified for each property;
- a selection process (42 in FIGS. 3 and S610 to S670 in FIG. 6, for example) of selecting a database including high priority battery information from the classified databases on the basis of a required specification extracted from user presented information (S510 to S570 in FIG. 5); and
- a presentation process (42 in FIGS. 3 and S710 to S740 in FIG. 7, for example) of presenting a combination of a plurality of batteries with high coincidence with the required specification from the selected database.

According to the battery information processing method with Configuration 6, it is possible to provide a technique capable of storing battery information including a use history of batteries in databases categorized for each property and presenting a combination of a plurality of batteries with high coincidence with a required specification from a database including high priority battery information on the basis of user's required specification.

The invention is not limited to the foregoing embodiments, and various variations/changes are possible within the spirit of the invention.

What is claimed is:

1. A battery information processing system comprising:
at least one processor circuit with a memory comprising instructions, that when executed by the at least one processor circuit, cause the at least one processor circuit to at least:
- acquire battery information including use histories of batteries via a network;
- classify the batteries for each property on the basis of properties of the batteries specified from the battery information and store the battery information in a plurality of databases classified for each property;
- select a database including high priority battery information from the plurality of classified databases on the basis of a required specification extracted from user presented information including information regarding a model of a reused product to which the batteries are to be applied or an application of the reused product;
- determine the selected database as a database for selecting a combination of a plurality of batteries in a case in which a property of an assembled battery calculated by combining a plurality of batteries extracted from the selected database satisfies a criterion required by the required specification; and
- present combination information of the plurality of batteries selected in a descending order starting with a respective one of the batteries having a highest coincidence with the required specification from the determined database.

2. The battery information processing system according to claim 1, wherein the instructions, when executed by the at least one processor circuit, further cause the at least one processor circuit to obtain a battery property indicating an average for a plurality of batteries on the basis of the acquired battery information.

3. The battery information processing system according to claim 2, wherein the instructions, when executed by the at least one processor circuit, further cause the at least one processor circuit to calculate a plurality of parameters indicating degrees of change in properties of the batteries with reference to the battery property indicating the average and specify the properties of the batteries on the basis of the plurality of calculated parameters.

4. The battery information processing system according to claim 2, wherein the instructions, when executed by the at least one processor circuit, further cause the at least one processor circuit to:
- calculate a plurality of parameters indicating degrees of change in properties of the batteries with reference to the battery property indicating the average,
- determine a high priority parameter from the plurality of parameters on the basis of the required specification, and
- select a database including information of batteries specified on the basis of the determined parameters.

5. The battery information processing system according to claim 1, wherein the battery includes a reused battery that is a reused battery that used to be mounted in a vehicle that travels using an electric motor as a power source and used to supply power to the electric motor.

6. A battery information processing method of a battery information processing system, comprising:
- acquiring battery information including a use history of batteries via a network;
- classifying the batteries for each property on the basis of properties of the batteries specified from the battery information and storing the battery information in a plurality of databases classified for each property;
- selecting a database including high priority battery information from the plurality of classified databases on the basis of a required specification extracted from user presented information including information regarding a model of a reused product to which the batteries are to be applied or an application of the reused product;
- determining the selected database as a database for selecting a combination of a plurality of batteries in a case in which a property of an assembled battery calculated by combining a plurality of batteries extracted from the selected database satisfies a criterion required by the required specification; and
- presenting combination information of the plurality of batteries selected in a descending order starting with a respective one of the batteries having a from the highest coincidence with the required specification from the determined database.

* * * * *